Jan. 22, 1935.  W. J. PEARMAIN  1,988,748
CLUTCH
Filed June 10, 1933
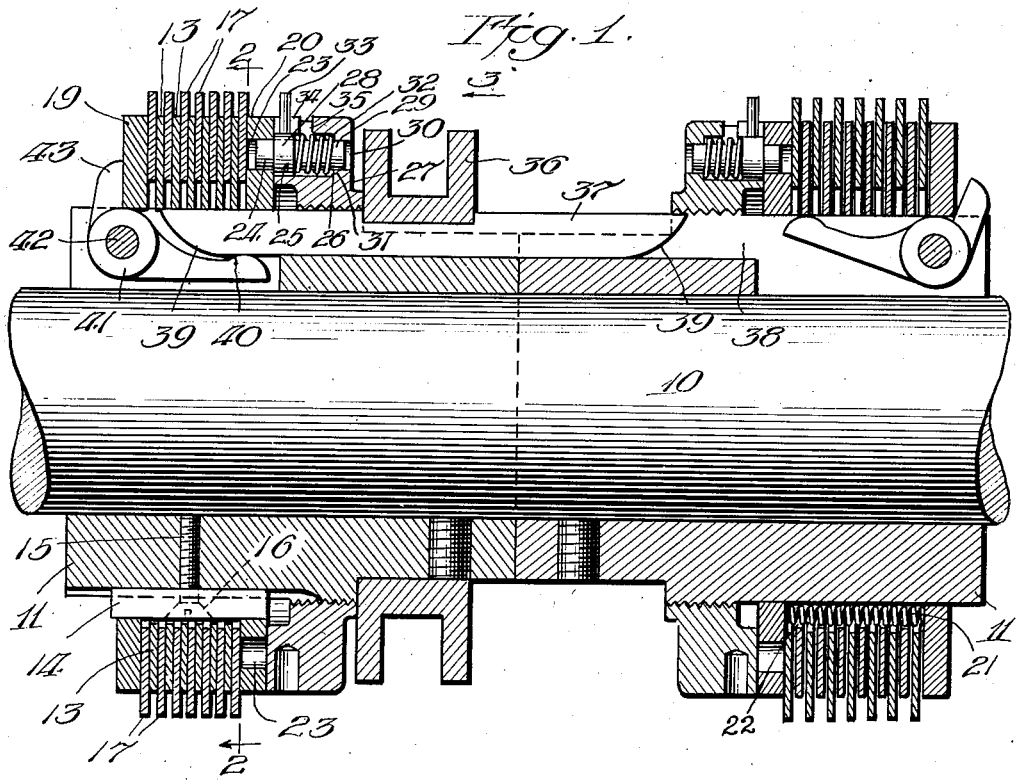
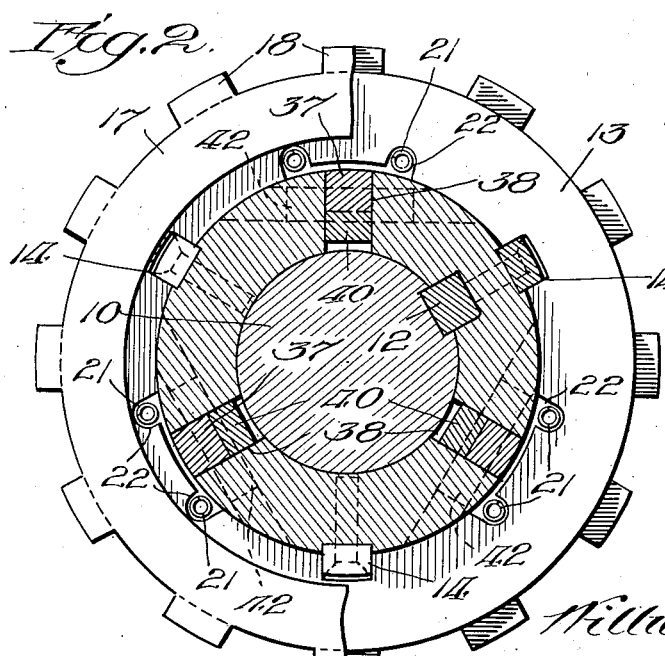
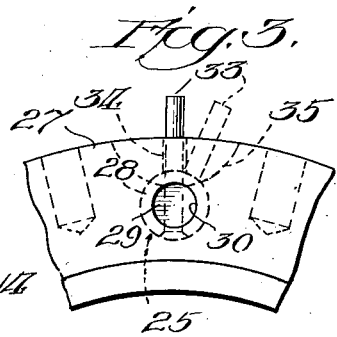
Inventor:
William J. Pearmain
by Rector, Hibben, Davis & Macauley
Attys.

Patented Jan. 22, 1935

1,988,748

UNITED STATES PATENT OFFICE 1,988,748

CLUTCH

William J. Pearmain, Racine, Wis., assignor to Twin Disc Clutch Company, Racine, Wis., a corporation of Wisconsin Application June 10, 1933, Serial No. 675,167

8 Claims. (Cl. 192—69)

My invention relates to clutches of the friction type and is concerned more particularly with the adjusting mechanism for taking up wear in the clutch parts as this condition occurs from time to time.

One object of my invention is to provide a clutch in which the adjusting member is locked in any predetermined position against the effect of inertia or momentum by the continuously acting pressure of the clutch release springs operating through parts engaging with the member.

A further object is to provide an adjusting ring carrying a lock pin which is adapted for locking engagement with one of the clamping rings of the clutch, and in which the locking pin is further conditioned for retraction to permit a repositioning of the adjusting ring, the locking pin being held in the retracted position during the relocating of the adjusting ring.

A further object is to devise an adjusting ring carrying an adjusting lock pin, in which the pin is conditioned for endwise movement transversely of the ring and for a rocking movement substantially in the plane of the ring, the pin being normally extended outwardly for locking engagement with one of the clamping rings of the clutch and having a part which, when the pin is moved to a retracted and rocked position, engages with the ring to maintain the pin in the retracted position.

A further object is to devise a clutch having an adjusting mechanism in the form of a ring in which the ring may be adjusted from time to time without any necessity of manually holding the locking pin against extension.

These and further objects of my invention will be set forth in the following specification, reference being had to the accompanying drawing, and the novel means by which said objects are effectuated will be definitely pointed out in the claims.

In the drawing:

Figure 1 is a sectional elevation showing a suggested type of clutch construction employing a dual arrangement of clutches with which my improved adjusting mechanism may be used.

Fig. 2 is a section along the line 2—2 in Fig. 1, looking in the direction of the arrows.

Fig. 3 is an end view of the upper portion of the adjusting ring, as viewed in the direction of the arrow 3 in Fig. 1.

The clutching mechanism illustrated in the present application is identical with that shown and claimed in my copending application, Serial No. 432,283, filed March 1, 1930. While this type of clutch has been selected as showing a typical operating environment for my improved adjusting mechanism, it will be understood that the latter may be employed with clutches generally where operative conditions permit.

Referring to the drawing, the numeral 10 designates a shaft having a pair of clutch hubs 11 secured thereto by means of keys 12, these hubs being placed in abutting relation and adjacent the opposite, outer ends of said hubs are mounted the clutch constructions which are identical in every respect. Accordingly, but one type of structure will be described, reference hereinafter being made to the left end clutch, as viewed in Fig. 1.

A plurality of friction driven discs 13 is secured to the hub 11 by means of a plurality of keys 14 circumferentially disposed in equispaced relation around the hub, three such keys being shown in Fig. 2. The discs 13 are arranged for axial movement on the keys and endwise movement of the latter is prevented by means of screws 15 which are passed therethrough for threaded engagement with the hub, the heads of the screws being flush with the outer faces of the keys by being countersunk therein, as indicated by the numeral 16 in Fig. 1. Alternately disposed with reference to the discs 13 is a plurality of friction driving discs 17 having a plurality of circumferentially disposed teeth 18 which are intended to engage with a second rotary part (not shown), which will be denoted as the driving member of the clutch.

The discs 17 are also arranged for axial movement and the two sets of discs 13 and 17 are forced into frictional, driving engagement by means of a pair of clamping members constituted by the floating plate 19 and the lock plate 20, the former contacting with the outer face of the group of discs and the latter with the inner face, as viewed in Fig. 1, both of the plates being secured to the hub 11 by the keys 14, so far as motion of rotation is concerned. The plates 19 and 20 are actuated to clamp the discs 13 and 17 by a mechanism hereinafter described and are retracted to a release position by a plurality of springs 21, circumferentially disposed around the periphery of the hub 11 and located within recesses 22 provided in the discs 13, the ends of the springs abutting at all times, whether in driving or release position, against the opposed, inner faces of the plates 19 and 20.

In addition to serving as a clamping member for the two groups of discs, the lock plate 20 serves to maintain the adjusting member of the clutch in any predetermined position. For this purpose, the plate 20 is provided with a plurality of circumferentially disposed holes 23 which are preferably equispaced around the annulus of the plate. These holes are intended to receive the reduced end 24 of a lock pin 25 which is carried and shiftable endwise in a cavity 26 provided in an adjusting ring 27 that is threaded on the hub 11. The intermediate portion of the pin 25 is enlarged to provide an annular flange 28, while the portion of the pin to the right of the flange is reduced as at 29 and slidable in a hole 30 that is aligned with the cavity 26, but is formed with a smaller diameter, thus forming an internal shoulder 31. A coil spring 32 encircles the reduced portion 29, one end of the spring abutting against the shoulder 31 and the opposite end against the flange 28 to thereby normally force the lock pin outwardly of the adjusting ring, or toward the left, as viewed in Fig. 1. A finger grip pin 33 is mounted in the flange 28 and, when the lock pin is occupying the position shown in Fig. 1, extends outwardly of the adjusting ring through a slot 34 that is only slightly wider than the diameter of the finger pin. The left end of the slot 34 terminates at the left face of the adjusting ring, while the opposite end of the slot communicates with an arcuate slot 35 that is transversely disposed with respect thereto and which also communicates with the cavity 26. In plan view, therefore, the slots 34 and 35 together form a T-shaped slot, the arrangement of the slot portions being such that, when the lock pin is occupying the position shown in Fig. 1, the sides of the slot 34 contact with the finger pin 33 to prevent any rocking movement of the locking pin, but when the latter is retracted to a position wherein it is free from one of the holes 23 in the lock plate 20, the locking pin may be rotated about its axis to place the finger pin 33 in the dotted position shown in Fig. 3, or one in which it contacts with a wall of the slot 35, thereby retaining the lock pin in retracted position. In connection with the foregoing description, it should be remembered that the clutch release springs 21 always exert pressure against the lock plate 20, therefore always maintaining this plate against the coacting face of the adjusting ring 27.

In order to actuate the clutch parts to driving position, a shifting collar 36, operated by a suitable fork (not shown), is carried on a plurality of slides 37, of which three are shown in Fig. 2, these slides operating reciprocably in axial directions in channels 38 cut inwardly from the periphery of the hubs 11. The ends of the slides are rounded as at 39 to define cam surfaces having the profile substantially of a wedge and these wedge-shaped cams are intended to actuate at each end thereof the rounded ends on arms 40 of bell crank levers 41 which are pivotally mounted on the hubs 11 by means of pins 42. Considering the left hub 11, these levers are preferably equispaced around the shaft 10, three such levers being shown in Fig. 2, and the other arm 43 of each lever actuates the loading plate 19 when each slide occupies the position shown in Fig. 1.

In the operation of the clutch devices, it is contemplated that the driving discs 17 on the left hub 11 will be connected to a suitable driving member, which will be characterized by one condition of operation as regards direction of rotation and speed of rotation, while the discs 17 on the right hand hub 11 will be driven by a second member which may be characterized either by a motion of rotation opposite to that being applied to the discs 17 on the left hub 11, or by a motion of rotation in the same direction but at a different speed. Accordingly, by the use of this dual type of clutch construction, it is possible to subject the shaft 10 to reversals of rotation as desired, or it may be subjected to changes in rotatory speed, dependent upon the character of the driving members which actuate the respective driving discs 17.

From an inspection of Fig. 1, it will be obvious that the left clutch occupies a driving position, while the right clutch is in a release position. By shifting the collar 36 toward the right, the slides 37 engage with the bell crank levers to thereby move the floating plate on the right clutch toward the left, thereby conditioning the friction discs for driving, while the friction discs in the left clutch are separated from each other by the release springs 21 as soon as the left ends of the slides 39 have cleared the bell crank levers 40.

As the friction discs wear, it becomes necessary to readjust the initial position of the lock plates 20 owing to the fixed range of movement of the bell crank levers 41. This adjustment is effected by means of the adjusting rings 27 which may be rotated on the hubs after having first withdrawn the locking pins from the holes in the lock plates 20. As above noted, the locking pins are first retracted and then rotated about their own axis to place each finger pin 33 in engagement with a wall of the slot 35. In this position of each locking pin, the reduced portion 24 thereof is entirely free of the lock plate 20, so that the adjusting ring may be freely rotated on the hub without any necessity for manually holding the locking pin in a retracted position.

Except during these periods of adjustment, the lock plate functions as the fixed base for the release springs 21 and also serves, owing to the pressure of these springs and the engagement between the plate and the locking pin, to effectually lock the adjusting ring in any desired position and this adjustment is maintained regardless of the reversing or change speed movements of the clutch mechanism, which might otherwise tend to shift the ring from its adjusted position owing to the effect of inertia or momentum of the parts. In other words, the release springs 21 serve the dual purpose of separating and holding the floating and lock plates apart, as well as maintaining through the lock plate the adjusted position of the adjusting ring.

I claim:

1. In a clutch, the combination of friction members adapted for driving engagement with each other, a clamping plate having a plurality of apertures for effecting the engagement, an adjusting ring abutting the plate in the driving and released positions of the members, spring means maintaining said abutting relation, and a locking pin carried by the ring and insertable in a selected aperture for maintaining the adjusted position of the ring.

2. In a clutch, the combination of friction members adapted for driving engagement with each other, a clamping plate having a plurality of apertures for effecting the engagement, an adjusting ring abutting the plate in the driving and released positions of the members, spring means maintaining said abutting relation, and a locking pin shiftable endwise in the ring and having a part adapted for extension beyond the face of the ring for insertion in a selected aperture for maintaining the adjusted position of the ring.

3. In a clutch, the combination of friction members adapted for driving engagement with each other, a clamping plate having a plurality of apertures for effecting the engagement, an adjusting ring abutting the plate in the driving and released positions of the members, spring means maintaining said abutting relation, and a locking pin rockable and shiftable endwise in the ring and having a part adapted for extension beyond the face of the ring for insertion in a selected aperture for maintaining the adjusted position of the ring, said pin having a portion contacting with the ring when in a retracted and rocked position for maintaining the pin in retracted position.

4. In a clutch, the combination of friction members adapted for driving engagement with each other, a clamping plate having a plurality of apertures for effecting the engagement, an adjusting ring abutting the plate in the driving and released positions of the members, spring means maintaining said abutting relation, and a rockable locking pin carried by the ring shiftable into and retractible away from locking engagement with the plate, said pin being rocked when in retracted position to engage a part thereof with the ring to maintain the same in retracted position.

5. In a clutch, the combination of friction members adapted for driving engagement with each other, a pair of clamping plates for effecting the engagement, one of the plates having a plurality of apertures, an adjusting ring contacting one of said plates in the driving and released positions of the members, a locking pin carried by the ring and insertable in a selected aperture for maintaining the adjusted position of the ring, and springs interposed between the plates for maintaining contact of the adjusting ring and the adjacent clamping plate.

6. In a clutch, the combination of friction members adapted for driving engagement with each other, a clamping plate having a plurality of apertures for effecting the engagement, an adjusting ring abutting the plate in the driving and released positions and having a cavity communicating with the periphery thereof through a slot T-shaped in plan, spring means maintaining said abutting relation, and a locking pin mounted in the cavity and shiftable to extend beyond the face of the ring for insertion in a selected aperture, said pin having a finger-gripping part projecting through the upright of the T-slot when the pin is in extended position and with one of the wings of the T-slot when the pin is occupying a rocked and retracted position.

7. In a clutch, the combination of friction members adapted for driving engagement with each other, a clamping plate having a plurality of apertures for effecting the engagement, an adjusting ring abutting the plate in the driving and released positions of the members, spring means maintaining said abutting relation, a locking pin shiftable endwise in the ring and having a part adapted for extension beyond the face of the ring for insertion in a selected aperture for maintaining the adjusted position of the ring, and means for holding the locking pin against extension when in a retracted position.

8. In a clutch, the combination of friction members adapted for driving engagement with each other, a clamping plate having a plurality of apertures for effecting the engagement, an adjusting ring abutting the plate in the driving and released positions of the members, spring means maintaining said abutting relation, a locking pin shiftable endwise in the ring and having a part adapted for extension beyond the face of the ring for insertion in a selected aperture for maintaining the adjusted position of the ring, and means in the pin engageable with the ring for holding the pin against rocking when occupying an extended position and engageable with the ring when the pin is occupying a rocked and retracted position for maintaining the pin in retracted position.

WILLIAM J. PEARMAIN.